United States Patent [19]

Taybl

[11] Patent Number: 4,791,244

[45] Date of Patent: Dec. 13, 1988

[54] CASING, PARTICULARLY A JUNCTION-BOX CASING FOR TELECOMMUNICATIONS ENGINEERING

[75] Inventor: Christa Taybl, Berlin, Fed. Rep. of Germany

[73] Assignee: Krone Aktiengesellschaft, Berlin, Fed. Rep. of Germany

[21] Appl. No.: 47,671

[22] Filed: May 6, 1987

[30] Foreign Application Priority Data

Jul. 16, 1986 [DE] Fed. Rep. of Germany ....... 3624347

[51] Int. Cl.$^4$ .............................................. H02G 3/08
[52] U.S. Cl. .................... 174/52.1; 220/337; 312/284; 312/328; 361/356
[58] Field of Search ........... 312/284, 313, 328; 292/300; 361/356, 426, 428; 220/3.2, 3.8, 335, 337, 344; 174/50, 50.51, 52 R, 52 S, 66; 52/220, 221, 126.2; 16/342, 348, 350

[56] References Cited

U.S. PATENT DOCUMENTS

| 2,206,326 | 7/1940 | Ludwig | 16/350 |
|---|---|---|---|
| 3,113,694 | 12/1963 | Sulzer | 174/50 |
| 3,333,726 | 8/1967 | Belanger | 220/337 |
| 3,346,308 | 10/1967 | Zimmermann | 312/328 |
| 4,428,482 | 1/1984 | Ogawa | 220/335 |
| 4,595,115 | 6/1986 | Huynh | 220/337 |
| 4,654,470 | 3/1987 | Feldman | 174/50 |

FOREIGN PATENT DOCUMENTS

G84203293 3/1985 Fed. Rep. of Germany .

Primary Examiner—G. P. Tolin
Attorney, Agent, or Firm—St. Onge Steward Johnston & Reens

[57] ABSTRACT

The invention relates to a casing, particularly a junction box casing (1) for telecommunications engineering, consisting of a box-shaped base (24), a cover (9) to close this, and a packing ring (14). According to the invention, upper and lower guide elements (2, 25) are provided, each of which consist of a pin (8, 13) on the inner sides of the side walls (27) of the cover (9) and of a pin guide (36, 37) on the outer walls (26) of the base (24). The pin guides (36, 37) are inclined at an acute angle to the base surface (28) of the base (24) and are directed toward the rear wall (30) of the base (24).

9 Claims, 7 Drawing Sheets

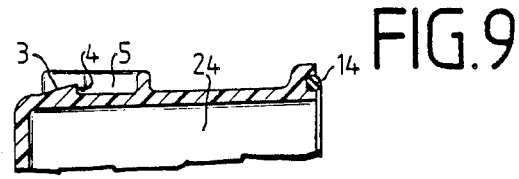
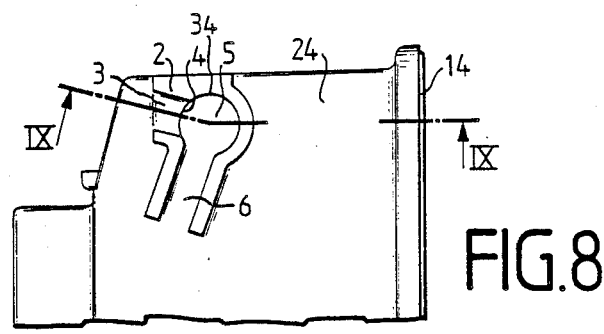
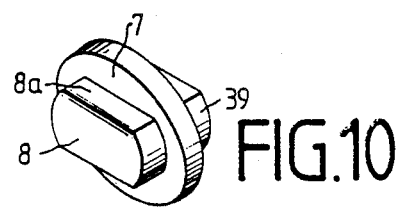
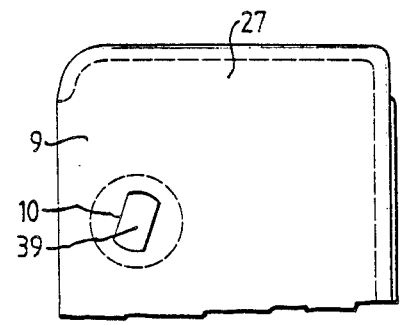

4,791,244

CASING, PARTICULARLY A JUNCTION-BOX CASING FOR TELECOMMUNICATIONS ENGINEERING

FIELD OF THE INVENTION

This invention relates to a casing, such as a junction-box casing for telecommunications engineering.

BACKGROUND OF THE INVENTION

A casing of the above-mentioned type is known from German Utility Model No. 84 20 329. This describes a casing that is used as a junction box casing in telecommunications engineering to receive terminal connectors for cable cores. The cover of the box-shaped base of the casing contains guide elements on the inner sides in the form of guide slots which are engaged by guide ribs that are located as guide elements on the outer sides of the base. In addition, guide angles are developed on the surface of the cover to prevent a lateral yielding of the cover.

A disadvantage in such casing is that the guide slots and the guide ribs are located in the lower region of the junction box casing and that the cover, after a short motion, can thus be entirely removed in a forward direction. The removed cover must thus be put down when the junction box casing is opened, as a result of which it can be easily lost. Furthermore, the sealing element arranged between the base and the covering cap is not uniformly pressed against the cover, since a guide for the cover is located in the lower region of the base.

SUMMARY OF THE INVENTION

It is, therefore, an object of the invention to provide a casing of the above-mentioned type, whereby a cover can be locked to the base in an open position so that the interior space of the base is freely accessible, and whereby the cover is uniformly pressed against the base during closure to provide a uniform sealing between the cover and the base.

This is achieved in accordance with one form of the invention by employing upper-located guide elements which serve to lock the cover in the open position and enable the cover to be rotated to a closed position. Lower guide elements are provided to guide and lock the cover during closure.

Pin guides are used and are inclined at an acute angle to a lower base surface and are oriented towards a rear wall of the base so as to enhance closure pressure on the cover. During closure of the box-shaped base by the cover, pins that are attached to this, are moved along upper and lower pin guides, so that the cover, during closure is gradually pressed with ever-increasing force against the base. In this manner, the sealing element that is located between the cover and the base, seals with a uniformly-distributed closure pressure.

Additional advantageous features of the invention enhance the security of the open cover position by the use of locking edges which normally serve to prevent separation of the cover from the base but can be overcome or passed when such separation is desired. A holding rib is provided to releasably engage a holding edge of the cover and thus fix the open position of the cover. A locking arrangement is provided to prevent opening of the casing by unauthorized persons.

These and other advantages and objects of the invention can be understood from the following description of a casing in accordance with the invention as shown in the drawings, in which:

BRIEF DESCRIPTION OF DRAWINGS

FIG. 8 is a side view of the upper end of the base with one of its upper guide elements;

FIG. 9 is a section view taken along the line 9—9 in FIG. 8 through the upper end of the base in the plane of the upper guide element;

FIG. 10 is a perspective representation of a locking disc with a locking element; and FIG. 11 is a side view of the upper end of the cover with a slot opening for the locking pin of the locking disc.

DETAILED DESCRIPTION OF DRAWINGS

Figure 1:
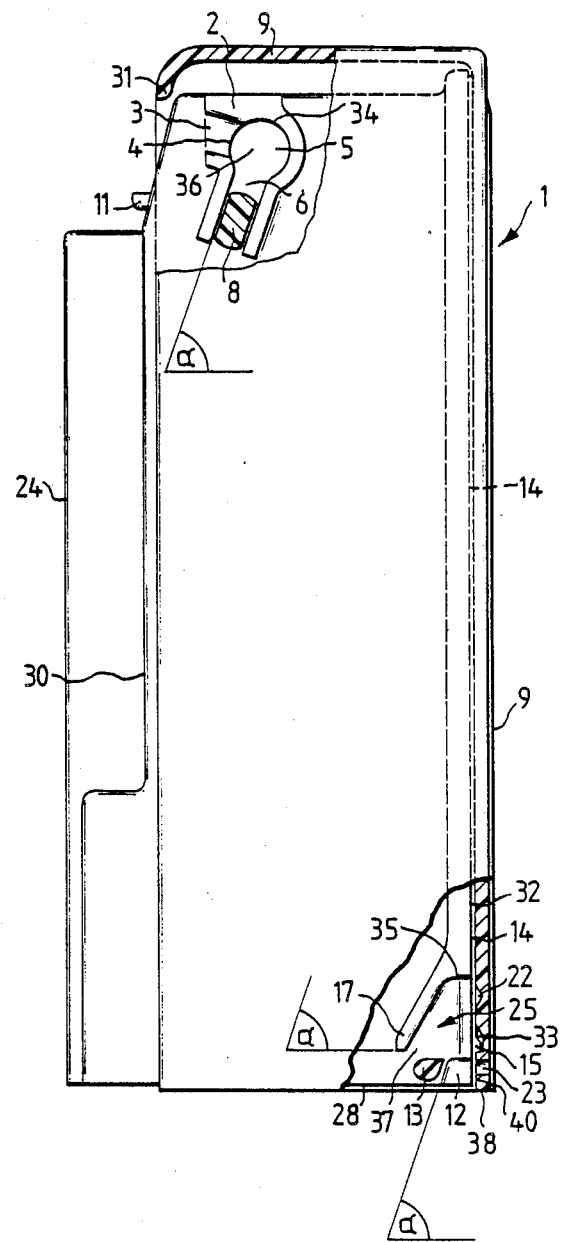
FIG. 1 is a side view of the junction box casing, presented in partially cut form.
Figure 3:
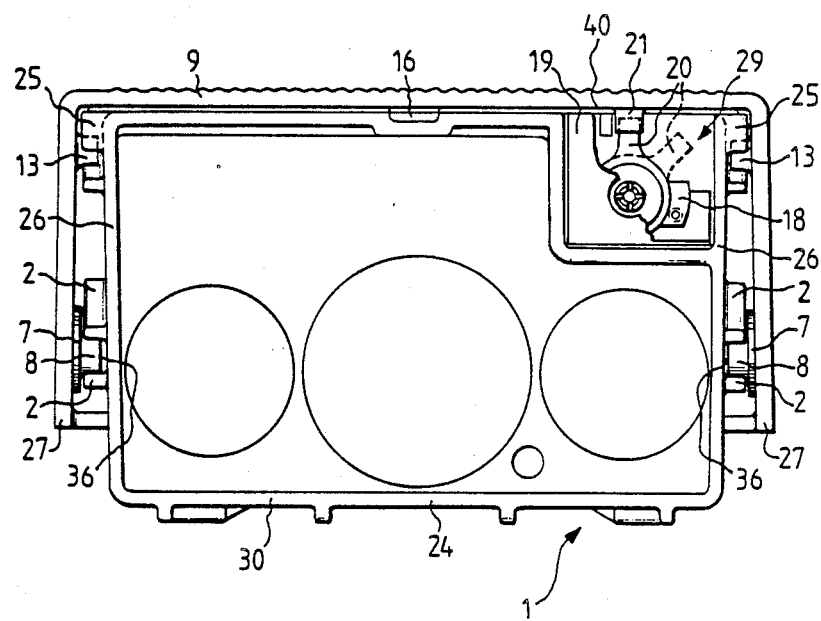
FIG. 3 is a bottom view of the junction box casing.
Figure 7:
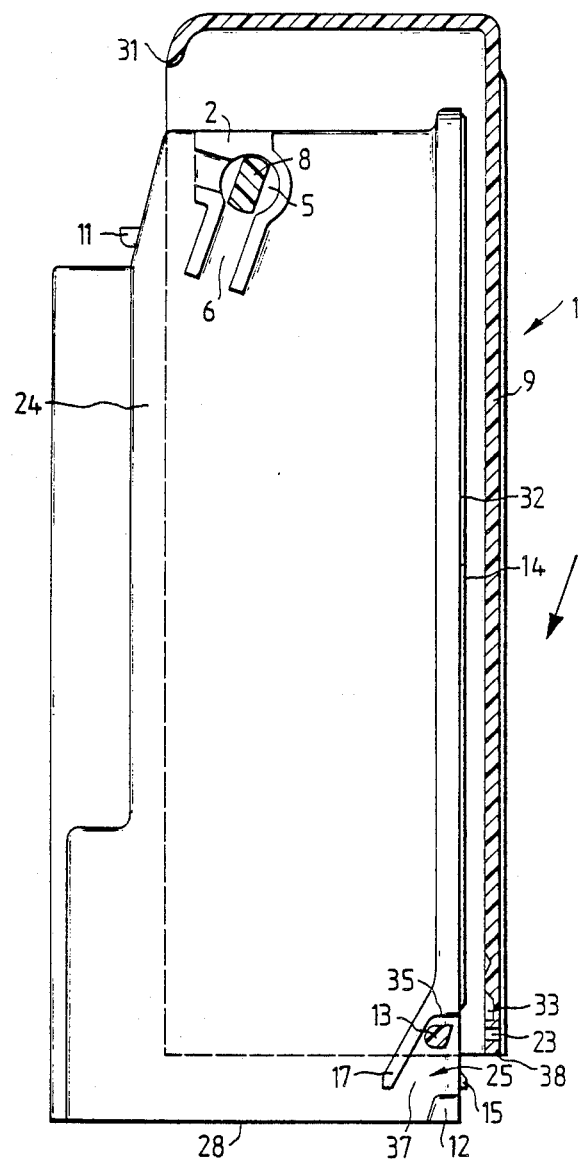
FIG. 7 is a side section view of the base with the cover located shortly before its closed position.

With reference to FIG. 1, a junction box casing 1 is shown with a rectangular cross-section and consists of a base 24, a cover 9 and a sealing element located between these and designed as a packing ring 14. Base 24 has a box-type shape and is provided with an open front side 32. The cover 9 closes base 24 and is U-shaped in the horizontal cross-section as shown in FIG. 3, and is L-shaped in the vertical cross-section as shown by FIGS. 1 and 7.

On both outside walls 26 (see FIG. 3) of the base 24, an upper guide element 2 is arranged on the outside in each case and serves as a pin guide 36 for a pin 8 arranged on the insides of the side walls 27 (see FIG. 3) of cover 9. The upper guide element 2, as shown in particular by FIGS. 8 and 9, consists of an inlet slant 3, a ramped-up locking edge 4 (see also FIG. 9), a pivot bearing 5, and a fixing slot 6. The latter slot is inclined at an acute angle, alpha, (see FIG. 1) to the lower horizontal bottom base surface 28 of base 24 in a direction that is toward rear wall 30. The fixing slot 6 and the inlet slant 3 are at an angle of approximately 90 degrees to each other and extend radially with respect to the pivot bearing 5. As shown by FIGS. 8 and 9, the inlet slant 3, the locking edge 4, the pivot bearing 5, and the fixing slot 6 are formed by webs, which are developed as an integral part on the outside surface of base 24 which is made of plastic.

Lower guide elements 25 (see FIG. 1) are also arranged on the outer sides of both side surface 26 of base 24 and are also an integral plastic part of base 24. The guide elements 25 consist of a guide web 17 directed at the angle, alpha, to the base surface 28 of the base 24. A clamping cam 12 is located at a distance from web 17 on the front lower corner of the base 24. The space between cam 12 and web 17 forms a pin guide 37 for a clamping pin 13 that is on the inside of the cover 9.

The pin 8 that is intended for engagement with the upper guide element 2 is formed as shown in FIG. 10 on the surface of a plastic locking disc 7. Pin 8 is provided with parallel side surfaces 8a, which, when the locking disc 7 is installed, are directed at the angle alpha (see FIG. 1) to the base surface 28 of the cover 9. On the side of the locking disc 7 opposite pin 8, there is arranged a correspondingly shaped locking pin 39 (see FIG. 10), which engages a correspondingly formed slot-like opening 10 in side walls 27 of the cover 9, as shown in FIG. 11. In another embodiment, pins 8 can also be developed on the side surfaces 27 (see FIG. 3) of the cover 9 and can be produced as an integral plastic part with this.

With reference to FIGS. 1 and 7, the cover 9, near its base surface 28 and near the front side 32, has on each of the inner sides of its side walls 27 a clamping pin 13 for introduction into the pin guide 37 of the lower guide elements 25.

The base 24 has on its front side 32, at the level of the clamping cams 12, a stop hook 15 and cover 9 has a correspondingly-arranged stop opening 33 at approximately the level of the clamping pin 13 in its front wall 40. The stop hook 15 lockingly engages opening 33 in the closed position of cover 9, as shown in FIG. 1.

Figure 5:
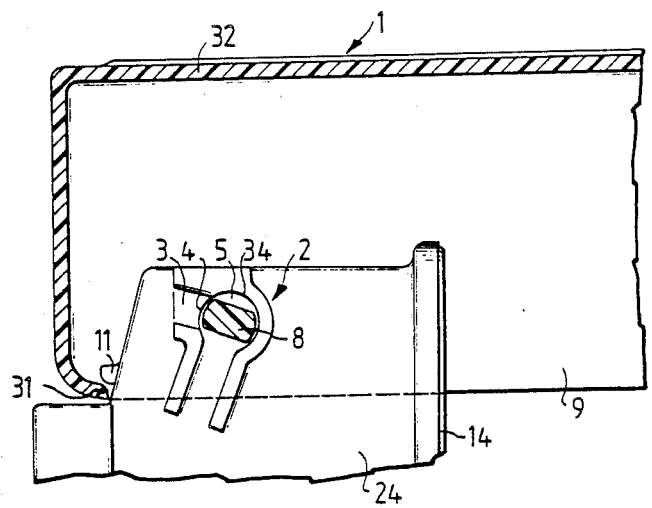

In addition, on the outer side of the rear wall 30 in the upper region of base 24, a holding rib 11 is aligned parallel to base surface 28 and a rear holding edge 31 depends from the upper end of the cover 9. The rib 11 and edge 31 are adjusted with respect to each other in such a way that the holding edge 31 as shown in FIG. 5 when the cover 9 is raised by 90 degrees, locks behind or below the holding rib 11 of base 24.

Figure 2:
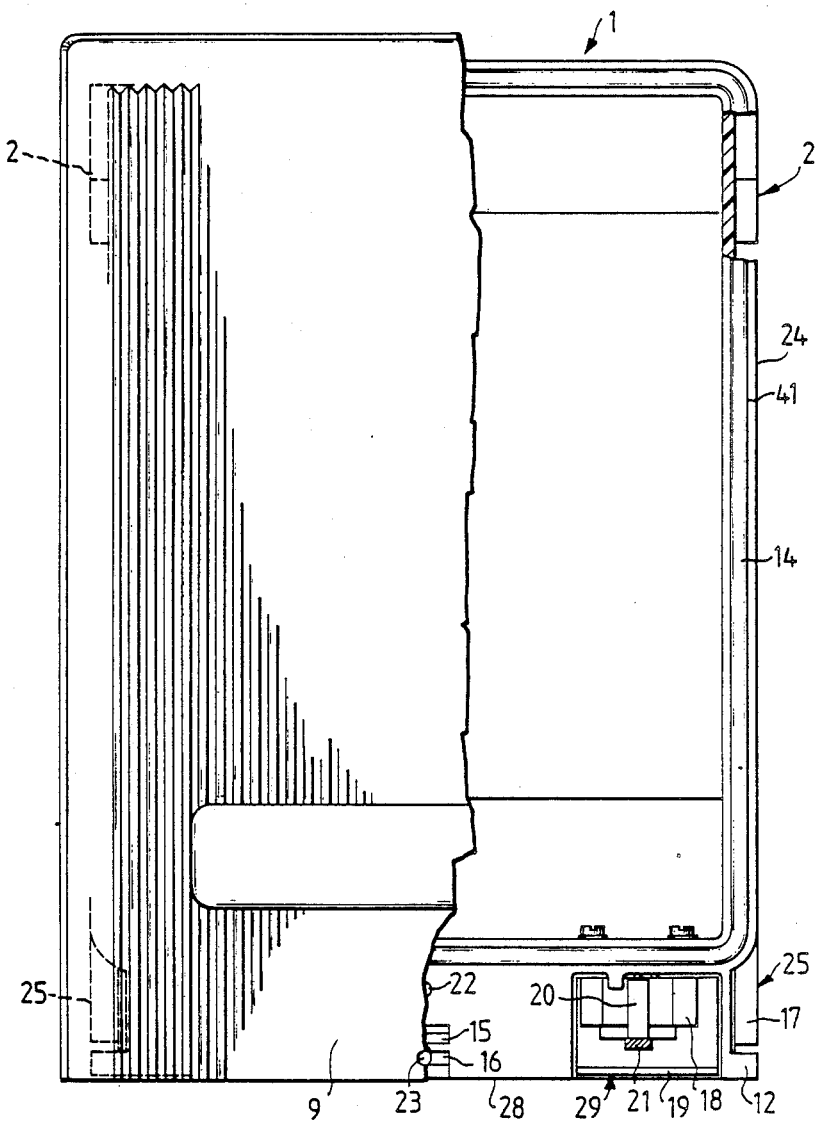
FIG. 2 is a partially cut-open front view of the junction box casing.

Finally as shown in FIGS. 2 and 3, a locking arrangement 29 is used consisting of a lock 18 fastened to the base 24 with a swiveling type closure catch 20 and a rib 21 attached to the inner side of front wall 40 of the cover 9. The closure catch 20 moves from an open position as shown with dotted lines in FIG. 3 behind rib 21 to lock cover 9

FIG. 2 also shows a continuous slot 41 located in the box-like open front side 32 of base 24. A packing ring 14 is inserted in slot 41. The latter seats against the inner side of the front surface of the cover 9 when the junction box casing 1 is closed.

The closing and opening of the junction box casing 1 consisting of the box-like base 24 and the correspondingly designed cover 9 is explained in greater detail below.

Figure 4:
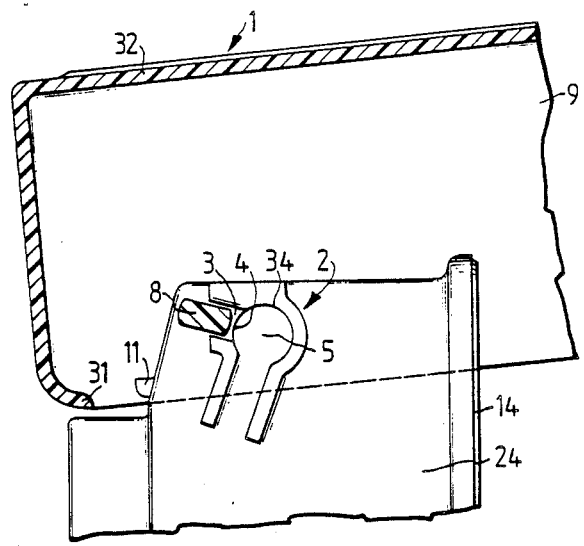
FIG. 4 is a section view of the upper end of the base and, located above it, the cover during its mounting to the base.

The free-standing pins 8 arranged on the inside at both side walls 27 of the cover 9 are first, as shown in FIG. 4, introduced into the inlet slant 3 of the upper guide elements 2 located on the base 24. When the pins 8 are pushed into the pivot bearing 5 of the upper guide elements 2, the ramping part of the locking edge 4 is overcome. As shown in FIG. 9, edge 4 serves as a closure catch so that the cover 9 can be removed again only after overcoming the sharp rise of this locking edge 4.

The pins 8 are now located in the pivot bearing 5 of the respective upper guide elements 2, while the cover 9 occupies a position that is approximately at a right angle to the base 24. In this position, as shown in FIGS. 4 and 5, the holding edge 31 can engage the upper rear end of the cover 9 behind the holding rib 11 that is aligned parallel to the base surface 28 at the upper end of the base 24. As a result, cover 9, despite its own weight, can be held in a horizontal cantilevered position that is approximately at a right angle to the base 24. In this position, shown in FIG. 5, the junction box casing 1 is opened and is freely accessible for work on components of telecommunications engineering located in casing 1, but not shown in greater detail.

Figure 6:
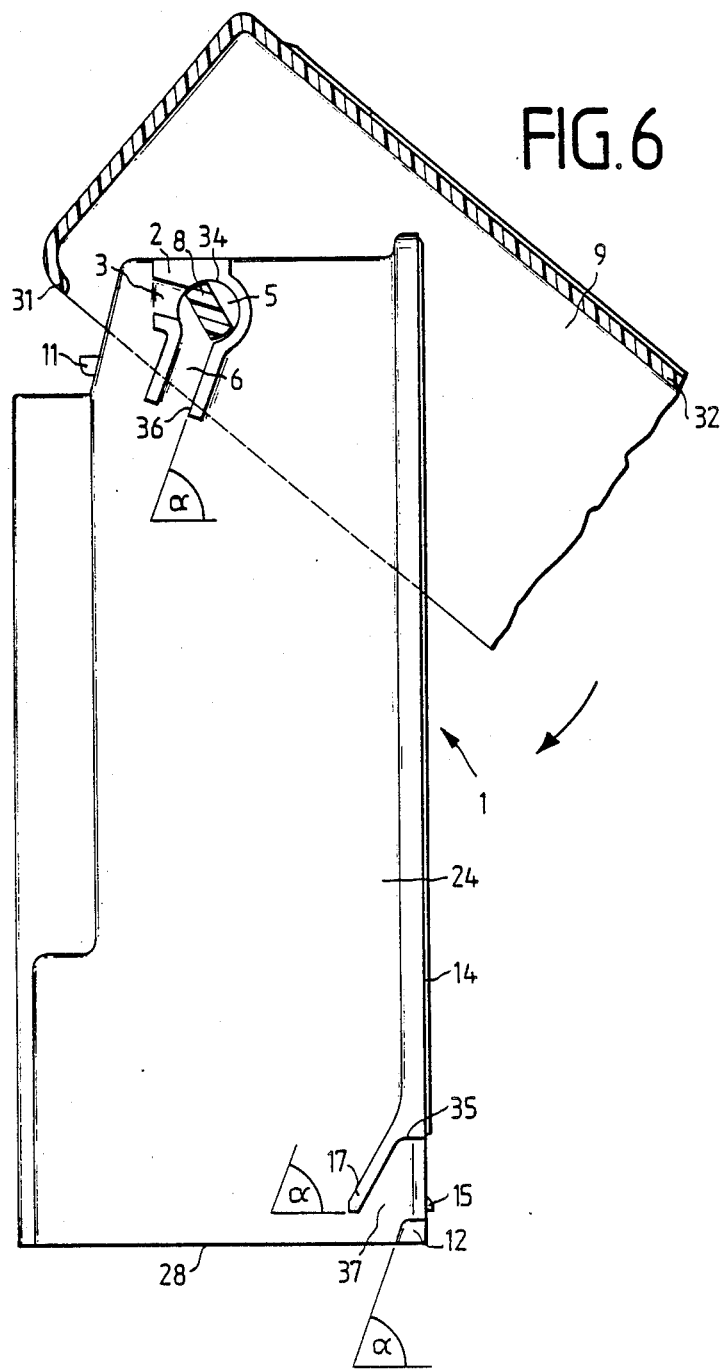
FIG. 6 is a side section view of the base with the cover in the process of being transferred from its open position to its closed position.

Closure of the junction box casing 1 commences, as shown in FIG. 6, by releasing the cover 9 with gentle pressure from its open locked position, whereby the holding edge 31 separates from the holding rib 11 to enable the cover 9 to be swivelled in a downward direction. The swivelling takes place under guidance of pins 8 while these are located in the respective pivot bearings 5.

In the approximately vertical position of cover cap 9 as shown in FIG. 7, the clamping pins 13 arranged on the inside bottom of the side walls 27 of the cover cap 9 engage the lower pin guides 37 of the guide elements 25 of the base 24. The clamping pins 13 are now guided along the lower guide elements 25 between the guide web 17 and the clamping cams 12. At the same time, the pins 8 are guided along the fixing slots 6 of the upper guide elements 2.

Since the fixing slots 6 and the guide web 17 are inclined at an acute angle alpha to the base surface 28 of the base 24 and the bottom located base surface 38 of cover 9, respectively, the front side 32 of cover 9 is now gradually pressed with an increasingly stronger pressure against the packing ring 14 located between the base 24 and front side 32, until the cover 9 fits against the packing ring 14 under a uniformly acting pressure. The clamping pin 13 of each lower guide element 25 now is located behind and makes contact with the clamping cam 12. Furthermore, in the final position of cover 9, the stop hook 15 of the base 24 snaps into the stop opening 33 of the front side 32 of the covering cap 9, as shown in FIG. 1.

The additionally applied locking arrangement 29, shown in FIGS. 2 and 3, serves to prevent opening of the covering cap 9 by unauthorized persons. The lock 18 with closure catch 20, is screwed with a cover plate 19 from the inside to the bottom wall of the base 24, as shown in FIG. 2. During closure of the locking arrangement 29, the closure catch 20 of the lock 18 pushes in front of the rib 21 located on the surface of the inside of cover 9, so that an opening of the cover 9 and free movement in an upward direction is prevented.

A pad lock (not shown) can be applied through marked holes 22 (see FIG. 1) that are drilled into the base 24 and in the cover 9. In addition, the junction box casing 1 can be sealed by means of sealing holes 23 provided in the base 24 and in the cover 9.

For opening the junction box casing 1, after unlocking of the locking arrangement 29, a screwdriver must be introduced into a free space 16 (see FIG. 2) and which is arranged near the stop hook 15 and the stop opening 33 for their disengagement. The cover 9 is then uniformly pushed upwardly by a small amount, until, as shown in FIG. 7, the pins 8 push against the bearing surfaces 34 of the pivot bearings 5 and the clamping pins 13 push against the end surfaces 35 of the guide webs 17. As a result of the forced guidance of the pins 8 along the fixing slots 6 and of the pins 13 at the guide web 17, the cover 9 can be uniformly lifted off from the packing ring when cover 9 is pushed in an upward direction. The cover 9 can be opened by swivelling it, until the holding edge 31 locks behind the holding rib 11 (see FIG. 5).

Having thus described an illustrative embodiment in accordance with the invention, its advantages can be appreciated. Variations from the described embodiment can be made without departing from the scope of the invention.

What is claimed is:

1. A junction box type casing, such as a distributor casing for telecommunications engineering, wherein a box-shaped base having a lower base surface and which is closable with a cover and wherein a sealing element is arranged between the base and the cover and elements including guide elements are arranged between opposing side walls of the base and cover to guide placement of the cover during opening and closing of the base, comprising;

said guide elements include upper and lower guide elements which are interposed between the base and the cover at respective opposite sides thereof, and with said upper and lower guide elements on said respective sides being formed with pins and pin guides which collectively hinge the cover to the base, with pin guides including guide portions that are operatively inclined towards a rear wall of the base and are inclined at an acute angle with respect to the lower base surface, wherein said junction box includes means for supporting terminal connectors for cable cores.

2. The casing according to claim 1, wherein the cover has side walls with inner sides;

and wherein the pins have guide surfaces directed at an angle to said base surface and wherein the pin guides of the upper guide elements are each formed with an inlet slot, a locking edge, a pivot bearing, and a fixing slot.

3. The casing according to claim 2 wherein the cover has slot-like openings in its side walls and wherein the pins of the upper guide elements have locking pins shaped to engage and be placed in the slot-like openings.

4. The casing according to claim 2, wherein the pins are an integral part of the cover.

5. The casing according to claim 2, wherein the fixing slots form said pin guide portions and are directed at an acute angle to the rear wall of the base and wherein the inlet slant and the fixing slot are arranged radially with respect to the pivot bearing and are displaced by approximately 90 degrees with respect to each other.

6. The casing according to claims 1, 2, 3, 4 or 5, and wherein the lower guide elements on said respective sides consist of a clamping pin located on the inner sides of the side walls of the cover, a guide web located on the base at an angle to the lower base surface and a clamping cam, said web and cam being so placed as to form a pin guide for the clamping pin.

7. The casing according to claim 6, wherein the base is provided with a stop hook on the front side of the base at a commensurate level with the clamping cam, and wherein the cover has a correspondingly-arranged stop opening located to receive the stop hook and lockingly engage the cover in its closed position.

8. The casing according to one of the claims 1, 2, 3, 4, or 5, wherein the base is provided with a holding rib operatively aligned parallel to the base surface and located on the outer side of the rear wall of the base in an upper region thereof, and wherein the cover has a rear holding edge located at an upper end of the cover, the holding rib and the rear holding edge being so located that the rear holding edge, in an open position of the cover, catches the holding rib to hold the cover in its open position.

9. The casing according to claim 8 and further including a locking arrangement, consisting of a lock fastened to the base, a swivelling closure catch, and a rib attached to the inside of the front wall of the cover, said closure catch being shaped to lockingly engage the rib to lock the cover.

* * * * *